United States Patent
Spitler et al.

(10) Patent No.: US 6,881,393 B2
(45) Date of Patent: Apr. 19, 2005

(54) PROCESS FOR MAKING NANO-SIZED AND SUB-MICRON-SIZED LITHIUM-TRANSITION METAL OXIDES

(75) Inventors: Timothy M. Spitler, Fernley, NV (US); Jan Prochazka, Reno, NV (US)

(73) Assignee: Altair Nanomaterials Inc., Reno, NV (US)

(*) Notice: Subject to any disclaimer, the term of this patent is extended or adjusted under 35 U.S.C. 154(b) by 53 days.

(21) Appl. No.: 10/383,821

(22) Filed: Mar. 7, 2003

(65) Prior Publication Data

US 2003/0228464 A1 Dec. 11, 2003

Related U.S. Application Data

(60) Provisional application No. 60/362,723, filed on Mar. 8, 2002.

(51) Int. Cl.[7] .................................................. C01G 1/02
(52) U.S. Cl. ........................................ 423/598; 423/641
(58) Field of Search ................................ 423/598, 641; 501/134

(56) References Cited

U.S. PATENT DOCUMENTS

| | | | | |
|---|---|---|---|---|
| 3,765,921 A | * | 10/1973 | Puskar .......................... 106/457 |
| 4,058,592 A | * | 11/1977 | Quets ......................... 423/594.2 |
| 5,160,712 A | * | 11/1992 | Thackeray et al. .......... 423/138 |
| 5,173,455 A | * | 12/1992 | Terbot et al. ................... 501/12 |
| 5,807,532 A | | 9/1998 | Satoh et al. |
| 6,348,182 B1 | * | 2/2002 | Lu et al. ........................ 423/599 |
| 6,375,923 B1 | | 4/2002 | Duyvesteyn et al. |
| 6,409,985 B1 | * | 6/2002 | Numata et al. ............... 423/599 |
| 6,440,383 B1 | | 8/2002 | Duyvesteyn et al. |
| 6,447,739 B1 | * | 9/2002 | Krynitz et al. ............. 423/179.5 |
| 6,548,039 B1 | | 4/2003 | Duyvesteyn et al. |
| 6,680,041 B1 | * | 1/2004 | Kumar et al. ................. 423/605 |
| 6,719,821 B1 | * | 4/2004 | Yadav et al. ..................... 75/343 |
| 6,737,037 B1 | * | 5/2004 | Ramasamy et al. ........ 423/594.6 |
| 2001/0014421 A1 | | 8/2001 | Akihiko et al. |
| 2002/0071806 A1 | | 6/2002 | Sabacky et al. |
| 2002/0082167 A1 | | 6/2002 | Sabacky et al. |
| 2003/0017104 A1 | | 1/2003 | Spitler et al. |
| 2003/0086865 A1 | | 5/2003 | Sabacky et al. |

FOREIGN PATENT DOCUMENTS

| | | |
|---|---|---|
| DE | 198 37 625 A | 3/1999 |
| EP | 1 026 765 A | 8/2000 |
| GB | 2 328 684 A | 8/1998 |
| WO | WO 98 41476 A | 9/1998 |

OTHER PUBLICATIONS

Prosini, P. P. et al., "Li4Ti5012 as anode in all–solid–state, plastic, lithium–ion batteries for low–power applications", Solid State Ionics, North Holland Pub. Company, Amsterdam, NL, vol. 144, No. 1–2, Sep. 1, 2001, p. 186.

Robertson, A. et al., "New inorganic spinel oxides for use as negative electrode materials in future lithium–ion batteries", Journal of Power Sources, Elsevier Sequoia S.A., Lausanne, CH, vol. 81–82, Sep. 1999, pp. 352–353.

Lundblad, A. et al., "Effect of sintering procedures in development of LiCo02–cathodes for the molten carbonate fuel cell", Journal of Power Sources, Elsevier Sequoia S.A., Lausanne, CH, vol. 90, No. 2, Oct. 1, 2000, p. 225.

* cited by examiner

Primary Examiner—H. T. Le
(74) Attorney, Agent, or Firm—Brinks Hofer Gilson & Lione; G. Peter Nichols (57) ABSTRACT

A process is provided for making nano-sized or sub-micron sized oxides of lithium and a transition metal. The desired size is generally in the range 10 nm to 1000 nm and preferably in the range 10 nm to 100 nm. The particles have a narrow size distribution. The process includes milling and re-firing under controlled conditions so that crystallites of the desired particle size are grown.

12 Claims, 7 Drawing Sheets

PROCESS FOR MAKING NANO-SIZED AND SUB-MICRON-SIZED LITHIUM-TRANSITION METAL OXIDES

The present application claims priority to U.S. Ser. No. 60/362,723 filed Mar. 8, 2002, the entire contents of which is hereby incorporated by reference.

The present invention relates to a process for producing nano-sized and sub-micron-sized lithium titanate, lithium manganate, lithium cobalt oxide and other oxides of lithium and transition metals. It covers parts of the process and the product of the process. The starting material is a coarse oxide with low surface area. The product made according to the process of the present invention has a high surface area and a narrow particle size distribution.

BACKGROUND OF THE INVENTION

Lithium-transition metal oxides are materials presently used or under development for the electrodes of lithium ion batteries. The transition metals Co, Mn, Ni, Ti, and V have received particular attention for this application. Recently, it has become apparent that a smaller particle size and a narrower particle size distribution are beneficial for producing electrodes, which retain their charging capacity at high charging and discharging rates.

A method to prepare lithium titanate from inorganic solutions or suspensions is described in US Pat. Appln. Pub. 2003/0017104 A1, the relevant portions of which are incorporated herein by reference. That application describes a process to produce lithium titanate crystallites. The process achieves good phase and size control in the range of 5 to 2000 nm. In general, the process includes providing a source of lithium titanate with a particle size smaller than the desired particle size and re-firing the lithium titanate under conditions to produce a final lithium titanate having a desired particle size with a narrow size distribution and controlled surface area.

That application describes that a source of lithium titanate is from a process that includes forming a blend that comprises titanium and lithium. The blend is evaporated to form homogeneous particles containing a lithium salt and titanium dioxide. The evaporation is conducted at a temperature above the boiling point of the solution in the blend but below the temperature where reaction of the lithium salt and the titanium dioxide occurs. The homogeneous particles are calcined to form lithium titanate.

The lithium titanate is milled or crushed to a size smaller than the desired size of the final product. Finally, the milled lithium titanate is re-fired under conditions to produce lithium titanate having a desired surface area and size distribution.

The blend of titanium and lithium can be provided from a variety of suitable sources. For example, the blend of titanium and lithium is provided as aqueous chloride solutions of titanium and lithium. Alternatively, the blend of titanium and lithium is provided as a suspension of amorphous titanium dioxide in a lithium solution. In this instance, the lithium solution can be formed from a source of lithium selected from the group consisting of lithium chloride, lithium nitrate, lithium hydroxide, lithium sulfate, lithium oxide, lithium fluoride, lithium bromide, and mixtures thereof. In yet another alternative, lithium titanate, made by any known means and having a particle size smaller than the particle size of the desired product, can be used as the source of lithium and titanium for the re-firing step, where crystals are grown to the desired size.

A method to prepare mixed metal oxides and metal oxide compounds is also described in US Pat. Appln. Publication US 2002/0071806 A1 the relevant portions of which are incorporated herein by reference. This method applies to mixed oxides of lithium and transition metals. Products made according to this patent application can be used as starting materials for the process of the present invention.

Materials commercially available for the manufacture of battery electrodes generally have a wide particle size distribution and include large particles of several microns in size as well as very fine dust. Therefore, there is a need for materials having a narrow size distribution and having a controlled surface area for such applications as electrodes for batteries.

SUMMARY OF THE INVENTION

The present invention provides a process to produce lithium-transition metal oxides in the range 10 to 1000 nm, and preferably 10 to 100 nm with a narrow particle size distribution. The phrase narrow particle size distribution means that the particle size of the lithium-transition metal oxide is within 10 nm to 1,000 nm with a standard deviation of no more than 20%.

In general, the process starts from a coarse oxide of lithium and a transition metal. The coarse oxide of lithium and a transition metal can be provided by any suitable method including using commercially available coarse oxides. The process produces nano-sized crystals through a combination of milling, dispersion and calcining (re-firing) steps. The transition metal may be any metal commonly defined as transition metal, including but not limited to Ti, Co, Mn, V, Fe, and Ni.

DESCRIPTION OF THE INVENTION

According to the present invention, a process for making lithium-transition-metal oxides is provided. In this process, a lithium transition-metal oxide is milled or crushed to a size smaller than the desired size of the final product. The milled or crushed lithium-metal oxide is re-fired under controlled conditions to produce lithium-transition-metal oxide (e.g., lithium titanate) having a desired surface area and size distribution. Further processing may include dispersion, remilling, slurrying and spray drying and the final product may be a slurry, a spry dried powder consisting of agglomerates of nano-particles, or a fully dispersed powder.

Figure 1:
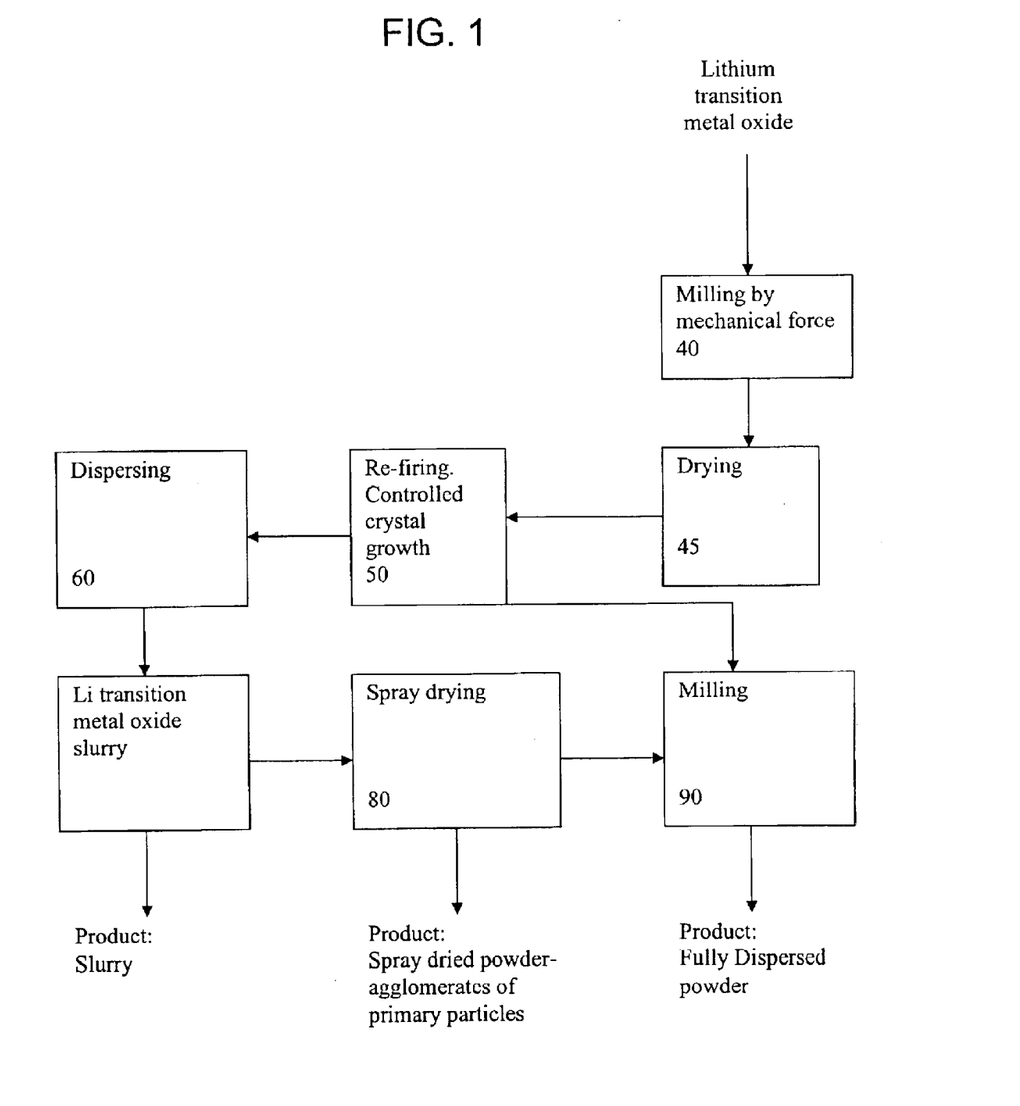
FIG. 1 is a flow sheet of the general aspect of the process.
Figure 2:
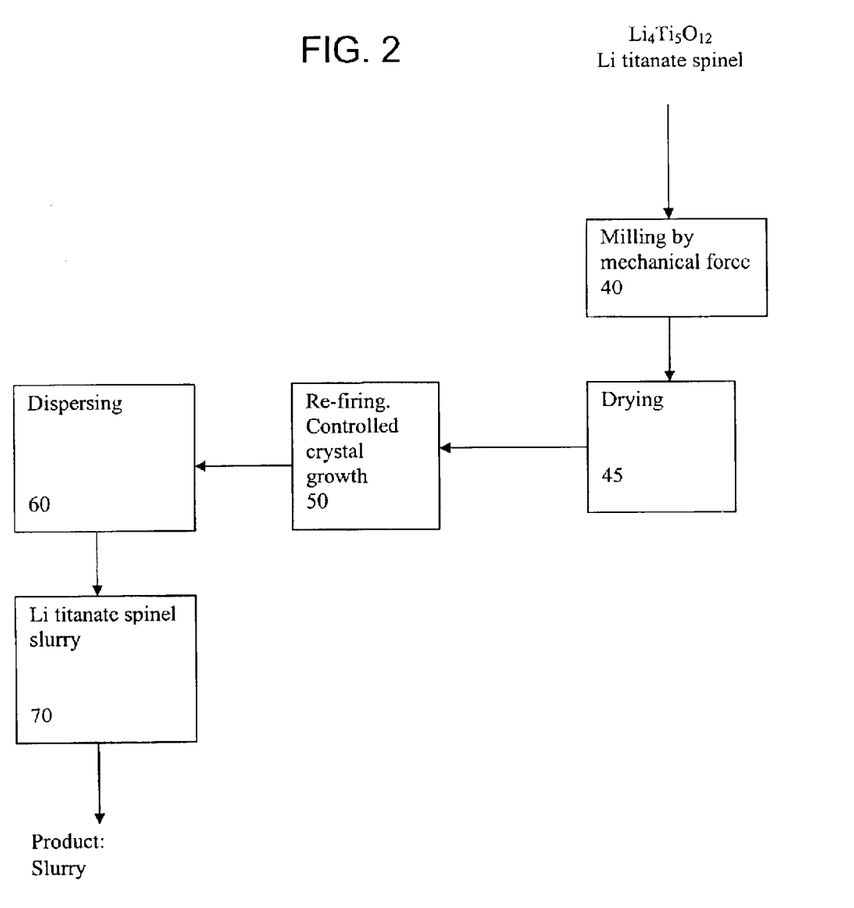
FIG. 2 is a flow sheet of the process according to one embodiment of the present invention, where the starting material is lithium titanate spinel and the final product is a slurry containing nano-sized particles.
Figure 3:
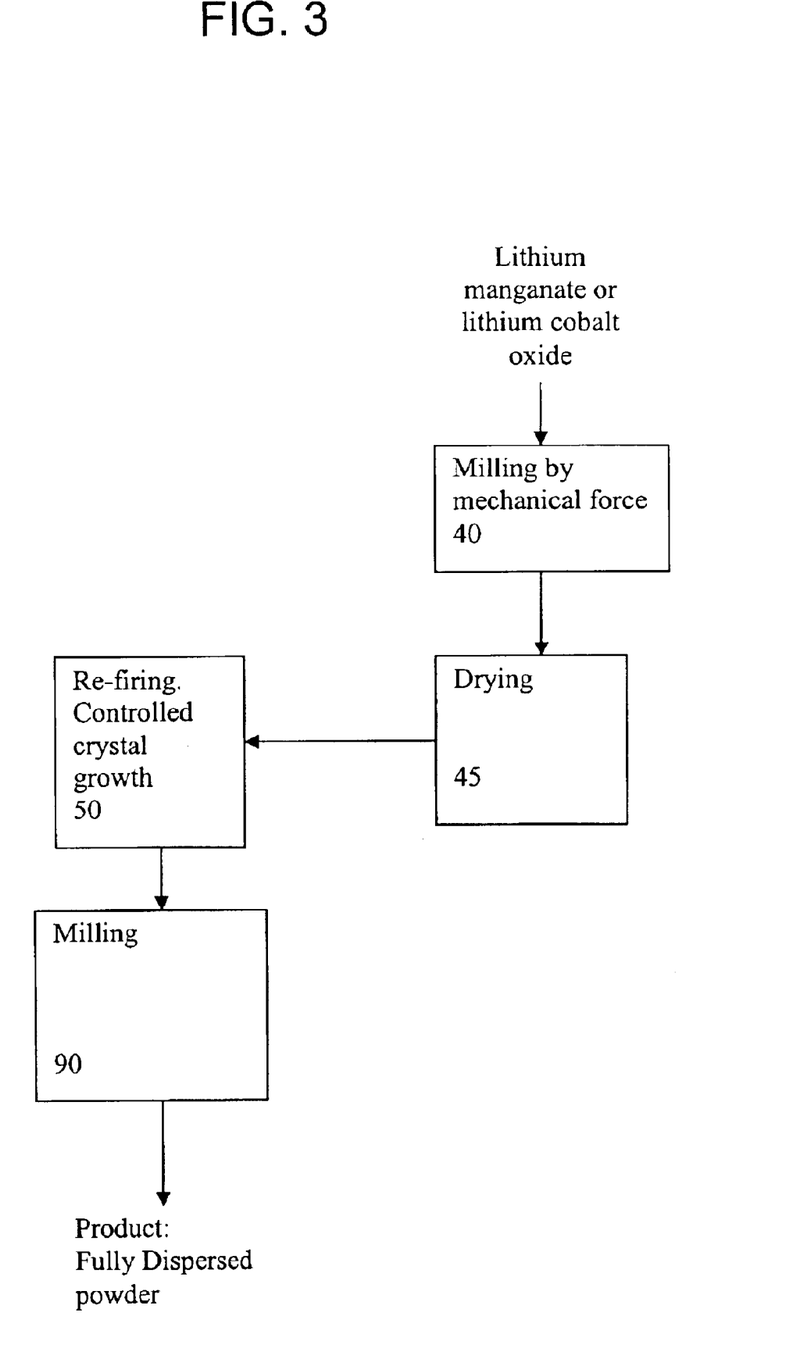
FIG. 3 is a flow sheet of the process according to the invention, where the starting material is lithium manganate $LiMn_2O_4$ or lithium cobalt oxide $LiCoO_2$ and the final product is a nano-sized dispersed lithium manganate or lithium cobalt oxide powder.

Turning now to FIG. 1, a flow sheet according to the general process is shown. Coarse lithium-transition-metal oxide particles are milled 40 to a desired median size. After milling, the lithium-transition-metal oxide (e.g., lithium titanate) is dried 45 and re-fired in a controlled temperature furnace 50 to produce particles having a desired size and size distribution.

Thereafter, the particles produced from the re-firing can be dispersed 60 or can be milled 90. If the particles are dispersed, they may be further processed or may be left as is. Further processing may include forming a lithium transition-metal oxide slurry 70, which can be further processed by spray drying 80 to produce spray-dried powder agglomerates that consist of primary particles. The spray-dried powder agglomerates may be sold or may be further processed by milling 90 to produce a fully dispersed powder.

The specific steps of the process will be explained in more detail below.

Starting Material

The starting material of coarse particles can be made by any method. For example, commercially available coarse lithium-transition-metal oxide particles can be used as the starting material. Alternatively, as noted above, one suitable method is described in US Pat. Appln. Publication 2003/0017104 A1, the relevant portions of which are incorporated herein by reference. While the process described in US Pat. Appln. Publication 2003/0017104 is directed to lithium titanate; it has now been found that the described process can be used to make the lithium transition-metal oxides described in the present application. In addition, a related method is described in US Pat. Appln. Publication 2002/0071806, the relevant portions of which are incorporated herein by reference.

According to those processes, a blend of a transition metal and lithium is provided by providing a source of lithium and a source of a transition metal. This blend may be referred to herein as the lithium-transition-metal blend or the transition-metal-lithium blend.

After the lithium-transition-metal blend is created, the blend is evaporated. The evaporation process is conducted above the boiling point of the liquid in the blend and below the temperature where significant reaction of the lithium and the transition-metal compounds occurs or where there is significant crystallization of lithium-transition-metal.

The evaporation is conducted under conditions to achieve substantially total evaporation and to form an intermediate. In particular, the evaporation is conducted at a temperature higher than the boiling point of the blend but lower than the temperature where significant crystal growth of an oxide phase occurs. The evaporation may be conducted at a temperature higher than the boiling point of the blend but lower than the calcination temperature of the intermediate.

The term "substantially total evaporation" or "substantially complete evaporation" refers to evaporation of greater than 85% of the free water content, preferably greater than 90% of the free water and more preferably greater than 95% of the free water present in the feed solution. The term "free water" is understood and means water that is not chemically bound and can be removed by heating at a temperature below 150° C. After substantially total evaporation or substantially complete evaporation, the intermediate product will have no visible moisture present.

The evaporation process is performed in a manner to control the physical form of the product. Preferably, the evaporation process is accomplished by spraying the blend while it is heated at a temperature in the range from about 120° C. to about 350° C., and desirably in the range from about 200° C. to about 250° C. This process may be conducted in a spray dryer.

As noted in US Pat. Appln. Pub. 2003/0017104 A1, the evaporation process may be conducted in such a manner as to form a film of a mixture of a lithium compound and an amorphous oxidized transition-metal compound. In this regard, the evaporation process may be conducted in such a way as to form a thin film of lithium salt on the preexisting particles of amorphous oxidized transition-metal compound.

In both cases, through control of the operating parameters, including temperature and concentration of transition-metal and lithium, the characteristics of the solid intermediate product can be reliably controlled within a fairly narrow range. For example, the product resulting from injection in a spray dryer, will generally be composed of hollow spheres or parts of spheres. The dimensions of the spheres may vary from less than 0.1 $\mu$m to 100 $\mu$m or more in diameter and a shell thickness in the range from about 30 nanometer to about 1000 nanometer or more. The structure of the shell consists of an intimate mixture of transition-metal and lithium compounds.

Evaporation by spraying also has the advantage of direct processing of the solution so that a homogeneous intermediate product is formed and so that evaporation of water and acid is simultaneously accomplished. Preferably, from about 90% to about 99% of any aqueous material is evaporated.

The product resulting from the evaporation step is calcined at a temperature and for a length of time sufficient to convert the mixture of transition-metal and lithium compounds to lithium transition metal oxide of the desired structure and particle size. Calcination temperatures can range between about 600° C. to 950° C. Desirably, the calcination is conducted at temperatures ranging from about 700° C. to about 900° C. The calcination time varies over a wide range, from about 1 hour to as long as 36 hours. Desirably, the calcination time is in the range from about 6 hours to about 12 hours. Lower temperatures will require longer calcination times. The product of calcination shows a structure of individual units that can be broken up by milling into particles of the desired median size and size distribution.

During calcination, the lithium salt reacts with oxygen and water in the furnace atmosphere to release, for example, HCl gas or nitrous and nitric oxides or other gases formed by decomposition of the salt present in the original solution. These gases may be recovered. The calcination conditions are chosen such that contact with oxygen is sufficient to substantially convert the mixture to a lithium transition-metal oxide with low impurity level.

The product of calcination may contain traces of the original lithium salt used as feed. To remove the traces of salt, the particles may be subject to one or several wash cycles. In each cycle, the particles are mixed with water and are separated by settling or filtration. The washing step is particularly useful if the lithium salt used is lithium chloride.

Milling

The lithium-transition metal oxide is suspended in water and milled in a horizontal or vertical pressure media mill to crush the crystals to a size smaller than the size desired in the final product.

Drying

The wet-milled particles are dried by any known means. For example, wet-milled particles may be dried in a spray drier at a temperature from about 120° to about 350° C., desirably from about 200° to about 250° C. Drying may also be part of the re-firing process.

Re-Firing

After milling or drying, the product is re-fired in a controlled-temperature furnace to make a product with a well-controlled specific surface area, consisting of regular-shaped crystals with a narrow size distribution. The refiring temperature is chosen to achieve the desired particle size and surface area of the product. In general, the re-firing temperature is between about 250° and 900° C., and the BET surface area of the re-fired product is in the range 5 to 100 $m^2/g$, with the higher re-firing temperature corresponding to the lower specific surface area.

Dispersing

After the refiring step, the product may be dispersed 60 to separate the agglomerates formed during re-firing into distinct nano-sized particles. This step is generally accomplished after slurrying the product in water. Alternatively, the product of the re-firing step may be milled 90, i.e., dry-milled, preferably in a jet-mill.

Further Processing

Depending on the destination of the final product, the product from the dispersing step can be kept as a slurry, or spray-dried, or spray-dried and jet-milled as indicated in FIG. 1.

The following examples illustrate, but do not limit, the present invention.

EXAMPLES

Example I

Figure 4:
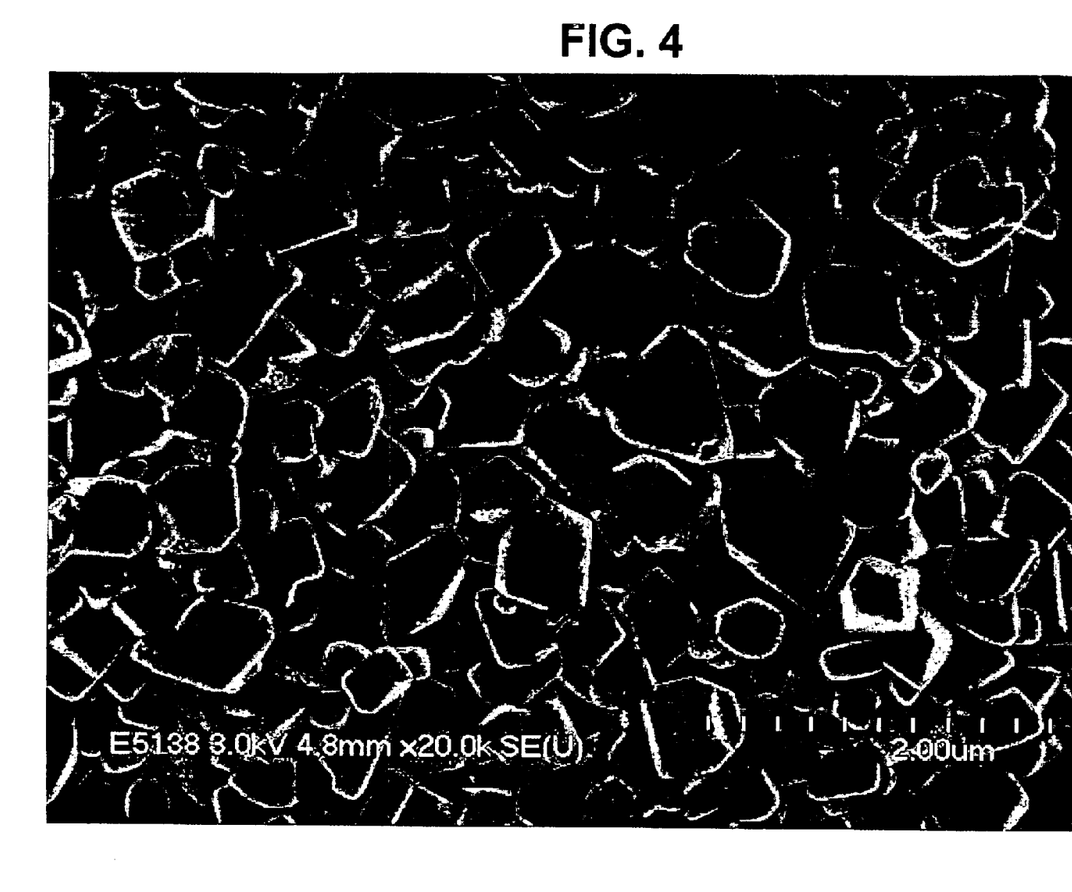
FIG. 4 is a scanning electron micrograph of lithium titanate spinel of about 1 to 2 $\mu$m in size, serving as starting material for the process of the present invention.

Lithium titanate made by spray drying according to US Pat. Appln. Publication 2003/0017104 A1 and described above was further calcined in an oxidizing atmosphere at a temperature of 800° C. for 12 hours. The product after calcination consisted of crystals of $Li_4Ti_5O_{12}$ of about 400 to about 1000 nm in size. FIG. 4 is a scanning electron micrograph of the product serving as starting material for the process of the present invention.

Figure 5:
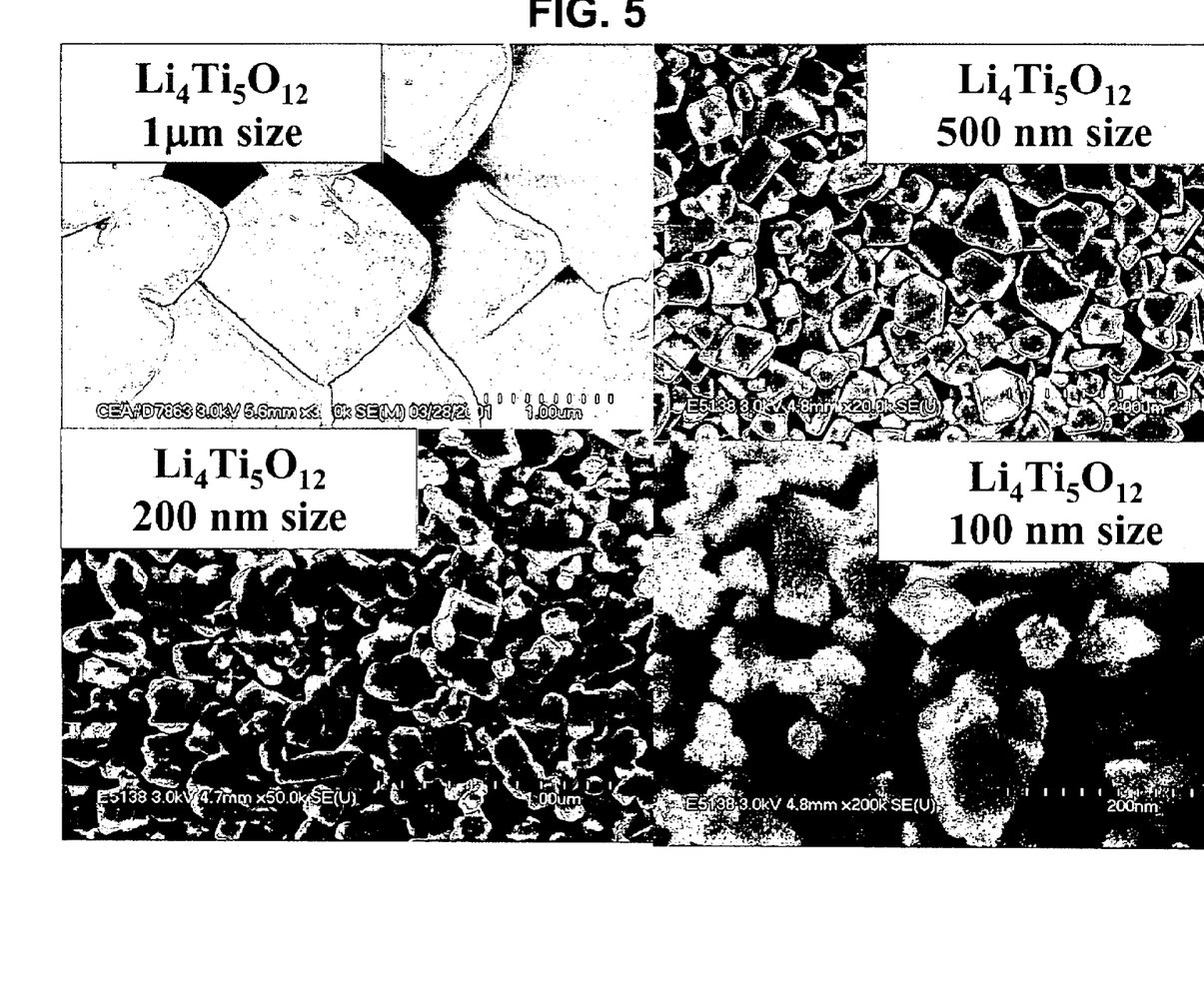
FIG. 5 is a scanning electron micrograph showing lithium titanate spinel products of different particles sizes, produced following the process of the present invention.

The product of the calcination step was further suspended in water and milled with 0.4 to 0.6 mm zirconia grinding media for 8 hours. The BET surface area of this product was 135 $m^2/g$. This product was refired at constant temperature for 3 hours. FIG. 5 shows electron micrographs of the product obtained after refiring at 900°, 650°, 500°, and 400° C. respectively. The particle size was about 100 nm at 400° C., and increased to about 200, 500 and 1000 nm respectively at the higher temperatures. The micrographs show well-formed crystals with a narrow size distribution.

Example II

Figure 6:
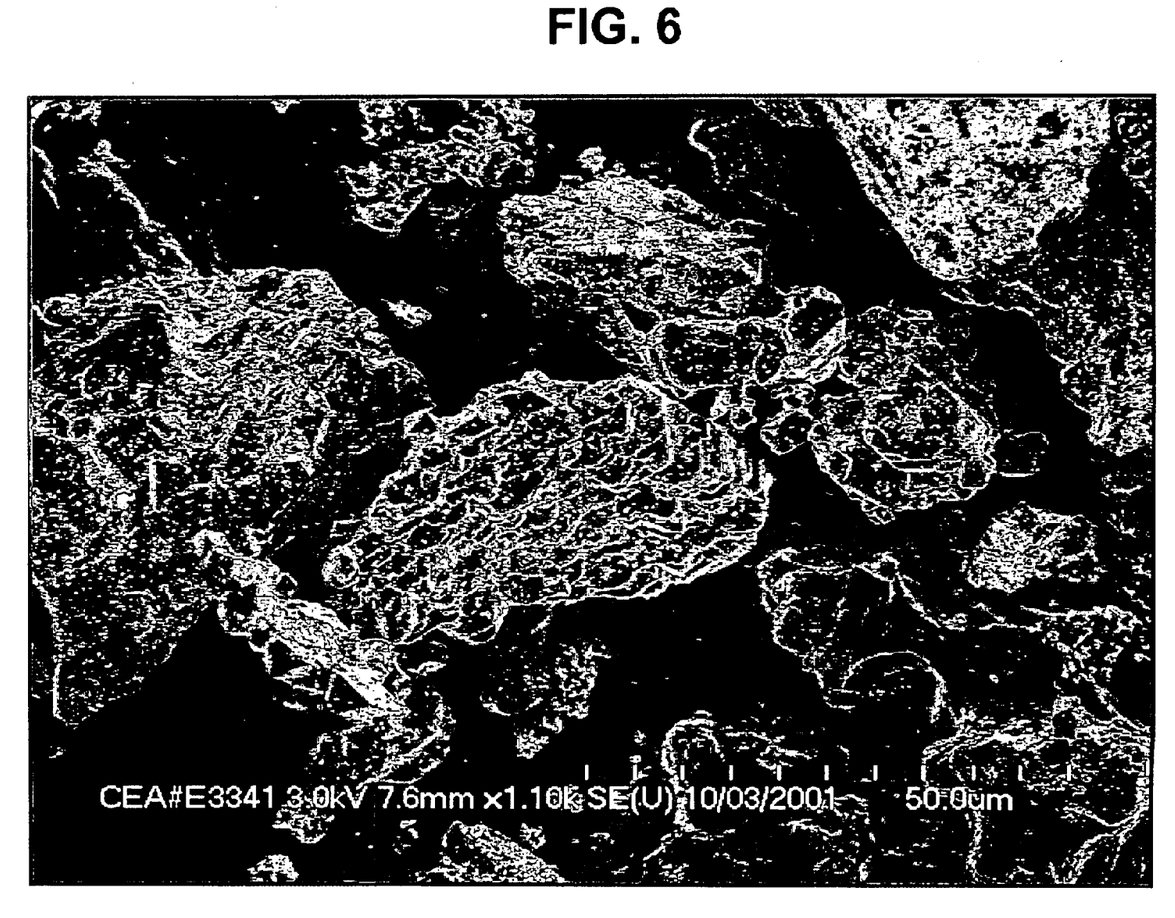
FIG. 6 is a scanning electron micrograph showing commercial lithium manganate used as starting material for the process of the present invention.

Commercial lithium manganate, of particle size and shape shown in FIG. 6, was slurried as a 40 weight % suspension in water and was milled in a Premier Mill bead mill for 20 h. The product of this operation was dried, and then calcined in ceramic trays placed in a constant temperature furnace for 3 hours. The results of calcinations at different temperatures are given in the Table below:

| Calcination temperature (C.) | Particle size (nm) |
| --- | --- |
| uncalcined | 15 |
| 400° | 20 |
| 450° | 30 |
| 500° | 50 |

Figure 7:
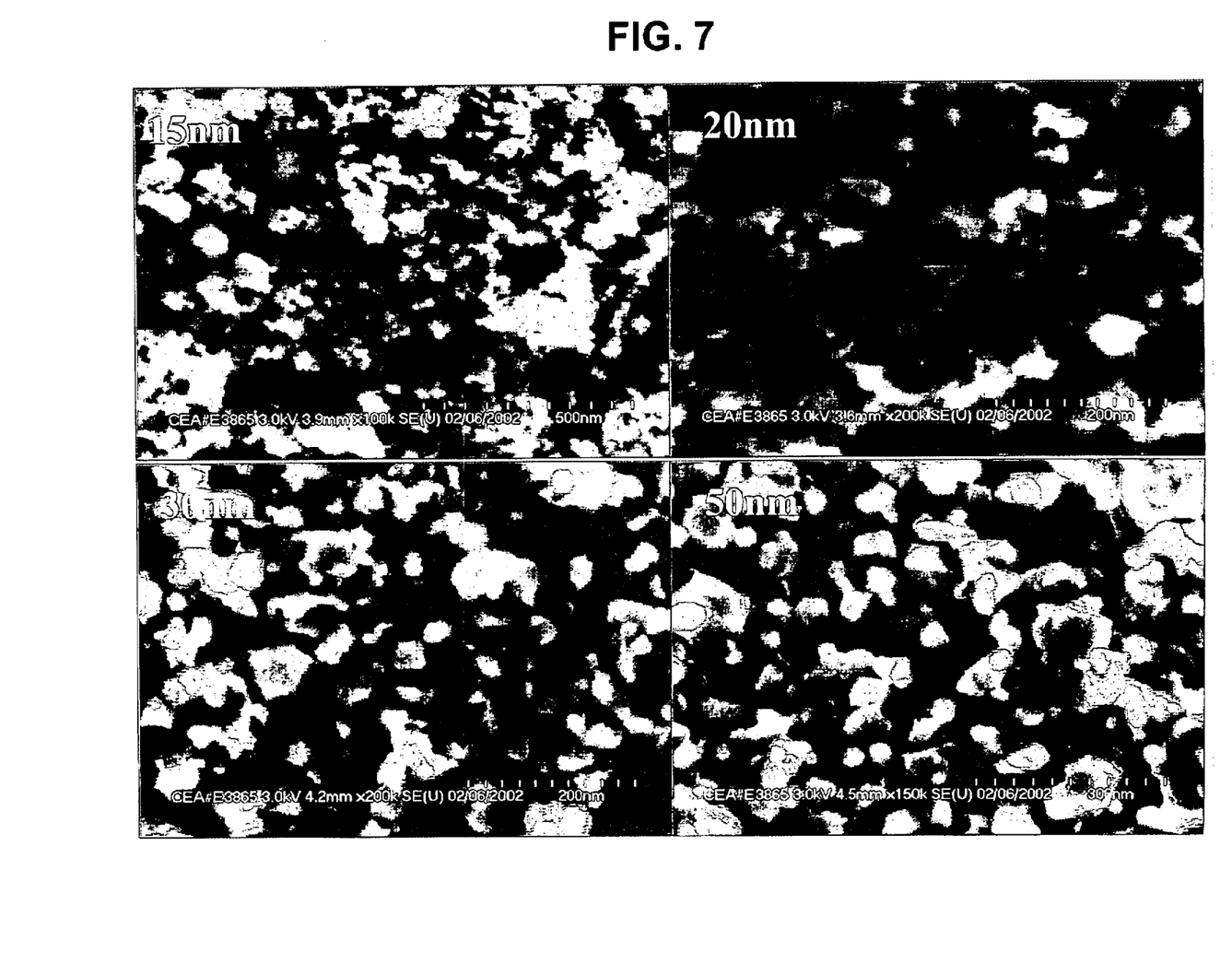
FIG. 7 is a scanning electron micrograph showing lithium manganate products of different particle sizes produced following the process of the present invention.

Electron micrographs of each of the samples are shown in FIG. 7. All calcined crystals are well formed and show narrow size distributions.

While the invention has been described in conjunction with specific embodiments, it is to be understood that many alternatives, modifications, and variations will be apparent to those skilled in the art in light of the foregoing description. Accordingly, this invention is intended to embrace all such alternatives, modifications, and variations that fall within the spirit and scope of the appended claims.

What is claimed:

1. A process for producing a nano-sized or sub-micron sized oxide of lithium and a transition metal comprising:
   a. providing lithium transition-metal oxide particles having a first size;
   b. milling the lithium transition-metal oxide particles to a median size smaller than the first size; and,
   c. re-firing the lithium transition-metal oxide to produce a final product having a size greater than the median size.

2. The process of claim 1 wherein the lithium transition-metal oxide is tetra lithium titanate spinel.

3. The process of claim 1 wherein the lithium transition-metal oxide is $LiCoO_2$.

4. The process of claim 1 wherein the lithium transition-metal oxide is $LiMn_2O_4$.

5. The process of claim 1 wherein the milling is accomplished by wet-milling in a bead mill.

6. The process of claim 1 further comprising:
   a. dispersing the product resulting from re-firing to liberate crystallites; and,
   b. slurrying the crystallites to form a suspension.

7. The process of claim 6 further comprising spray-drying the suspension.

8. The process of claim 1 further comprising milling the product resulting from re-firing to form a dispersed powder.

9. The process of claim 7 further comprising milling the spray-dried product to form a dispersed powder.

10. A lithium-transition metal oxide with a particle size between 10 nm and 1000 nm and a standard deviation of no more than 20% made according to the process of claim 1.

11. The process of claim 1 wherein the final product has a BET surface area in the range of 5 to 100 $m^2/g$.

12. The process of claim 1 wherein the final product has a particle size between 10 nm and 1000 nm and a standard deviation of no more than 20%.

* * * * *